Jan. 7, 1941. H. J. WADDELL 2,228,189
STOP VALVE
Filed Feb. 27, 1940
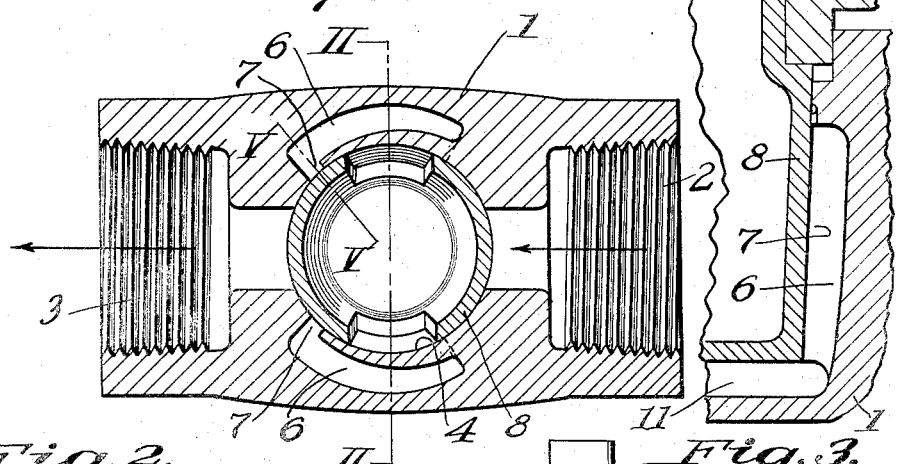
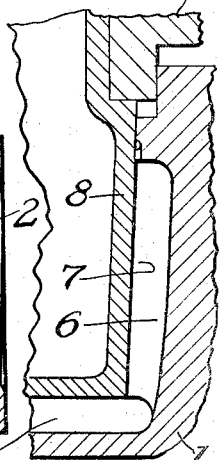
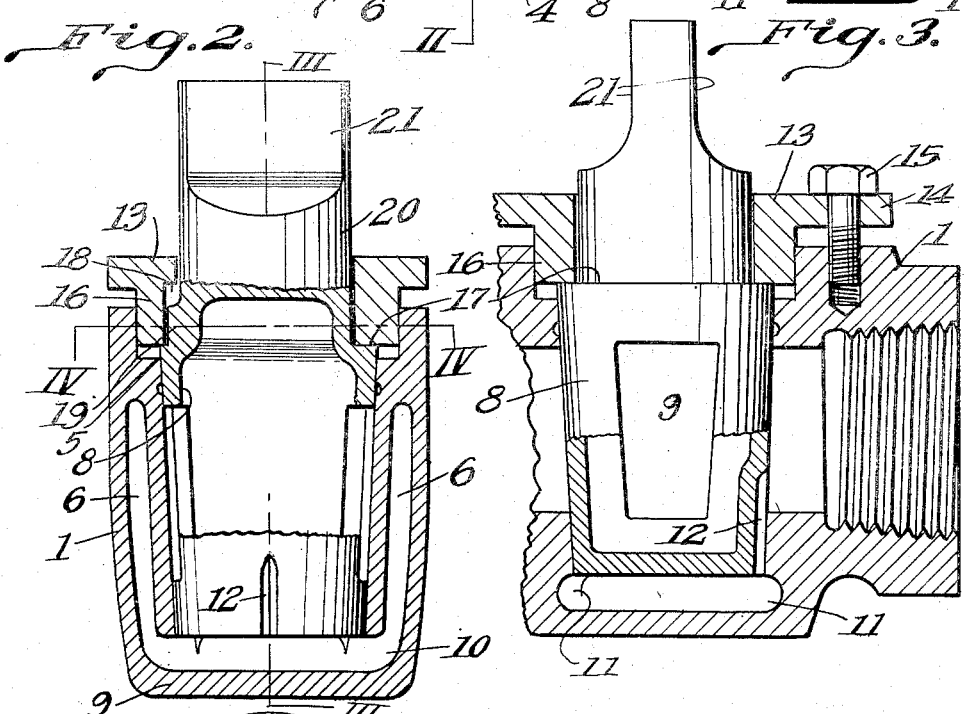
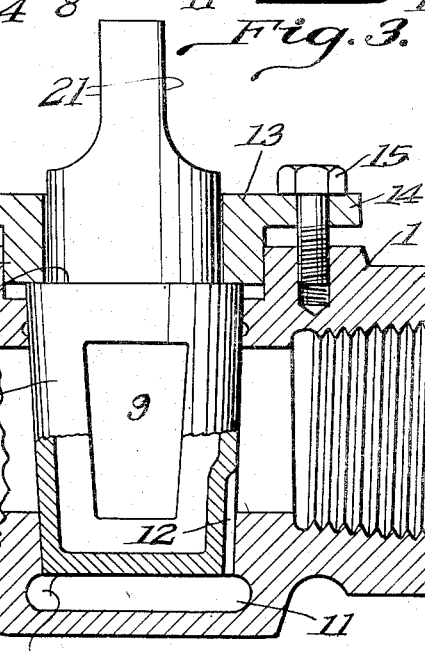
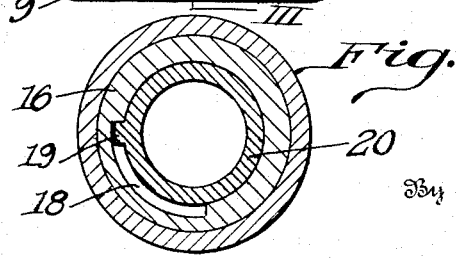
Inventor
Homer J. Waddell
By W. J. McDowell
Attorney Patented Jan. 7, 1941

2,228,189

UNITED STATES PATENT OFFICE 2,228,189

STOP VALVE

Homer J. Waddell, Baltimore, Ohio

Application February 27, 1940, Serial No. 321,079

12 Claims. (Cl. 251—93)

This invention relates to stop valves and is particularly directed to a stop valve for use in lines employed for conveying fluids under high pressure. The primary object of the invention resides in the provision of a stop valve which will be continuously lubricated and thereby readily moved from fluid flow obstructing to flow establishing positions.

Another object resides in providing a valve with a body in which lubricant-receiving chambers are formed, means being provided in the valve to introduce pressure from the fluid passing through the line to the lubricant to cause the application thereof to relatively movable surfaces of the valve parts.

Another object rests in spacing the lubricant-receiving chambers from the plug-receiving socket formed in the valve casing by flexible wall means which will operate to relieve the resistance exerted by the casing to turning movement of the plug.

A further object resides in providing a valve with a body having inlet and outlet openings communicating with a plug-receiving socket, the body being provided with a narrow seat surrounding the outlet port. Lubricant-receiving pockets are formed in the side walls of the body, slots establishing communication between the pockets and the interior of the socket adjacent the side portions of the seat.

A still further object resides in providing the valve with a plug in which a passageway is provided to establish communication between the inlet opening and the lubricant-receiving pockets when the plug is in a position to interrupt fluid flow through the valve body.

It is also an object to provide a valve body with a tapered plug-receiving socket having an open upper end. The closed end of the socket is slightly enlarged to provide a lubricant-receiving chamber at the lower end of the socket. The socket receives a tapered plug, the inner end of which terminates in spaced relation from the lower end of the socket and forms the top wall of the lubricant-receiving chamber. The side walls of the socket are provided with slots which are open at the lower end and communicate with the lubricant chamber below the lower end of the plug.

With these and other objects in view which will be apparent as the description proceeds, the invention resides in the novel construction and combination of elements to be hereinafter set forth.

In the accompanying drawing:

Fig. 1 is a horizontal sectional view taken through a stop valve formed in accordance with the present invention;

Fig. 2 is a vertical transverse sectional view taken on the plane indicated by the line II—II of Fig. 1;

Fig. 3 is a vertical longitudinal sectional view taken on the plane indicated by the line III—III of Fig. 2;

Fig. 4 is a detail horizontal sectional view taken on the plane indicated by the line IV—IV of Fig. 2;

Fig. 5 is a detail vertical sectional view taken on the plane indicated by the line V—V of Fig. 1.

Referring more particularly to the drawing, the numeral 1 designates the body of the valve. This body may be formed in any suitable manner such as by casting and includes inlet and outlet openings 2 and 3. These openings are provided with screw threads for the reception of similarly threaded pipe ends constituting parts of the line in which the valve is positioned. The body is provided with a tapered socket extending substantially at right angles to the axis of the passage formed by the inlet and outlet openings. The socket 4 is open at its upper end as disclosed at 5.

The side walls of the body 1 are each provided with a lubricant-receiving pocket 6 which is formed in the operation of casting the body by providing wing extensions on the core which forms the socket 4. The extensions are connected with the core at their forward and bottom edges, the connections at the forward edges producing narrow slots 7 in the tapered side wall of the socket at the forward ends of the pockets 6. The slots 7 are spaced a slight distance on each side of the outlet opening 3 and provide, with the portions of the socket wall above and below the opening, a narrow seat completely surrounding the outlet opening. The portions of the wall of the socket between the pockets 6 and the interior of the socket are made relatively thin to provide a limited amount of resiliency in order that the force exerted in an inward direction will be less than if the wall were solid. This flexibility is increased by reason of the slots formed by the connections at the bottom edges of the core, the slots connecting the lower ends of the pockets with the socket 4.

The socket receives a tapered plug 8 which is of the usual construction and includes a transversely extending port 9 to establish communication between the inlet and outlet openings when the plug is properly positioned. The side wall of the plug engages the flexible side walls between the pockets 6 and the socket and due to the flexibility of these portions of the socket side wall, the resistance to turning movement of the plug in the socket will be materially decreased. The length of the plug is such that when the side wall thereof engages the socket wall, the lower end of the plug will terminate in spaced relation from the bottom wall 9 of the body. This spacing forms a chamber 10 for the reception of a suitable lubricant. The lower end of the socket wall is relieved in registration with the inlet and outlet openings as at 11 to slightly increase the size of the chamber 10.

As shown in Fig. 5, the lower ends of the slots 7 are in open communication with the chamber 10. Prior to inserting the plug in the socket, the pockets and the chamber are filled with a suitable lubricant so that turning movement of the plug in the socket will be facilitated. To provide for the flow of the lubricating medium from the chamber 10 to the pockets 6 when the valve is in use, the plug is provided with a narrow slot 12 in the side wall thereof substantially at right angles to the axis of the transversely extending port 9. By this provision, the slot 12 will communicate with the inlet port 2 when the port 9 is out of registration with the inlet and outlet openings. At this time, the fluid may flow from the line through the opening 2, the slot 12, and into the chamber 10 where it will cause the lubricating medium to flow into the lower ends and upwardly into the pockets 6.

When the fluid pressure is thus introduced into the chamber 10, the pressure on the lubricant within the pockets will be equal to the fluid pressure in the line and will serve to yieldably hold the flexible walls in engagement with the plug. Inasmuch as this engagement is not positive, the plug will be readily rotatable from one position to another. Since the pressure is also applied to the under side of the plug, there will be a tendency to elevate the plug and release it from binding engagement with the walls of the socket.

To prevent undue elevation of the plug, a retaining collar 13 has been provided. This collar includes a pair of ears 14 having perforations through which threaded fastening elements 15 extend. The threaded ends of these elements are received within threaded openings in the upper surfaces of the body 1. The under side of the collar has a depending annular flange 16 which enters the enlarged upper end of the socket and engages a shoulder 17 on the plug. By threading the bolts 15 into the openings in the body, the plug may be forced downwardly into the socket and firmly seated to prevent flow of fluid between the walls of the plug and the body. The upper ends of the slots 7 terminate in spaced relation from the upper end of the socket to provide an annular seat for engagement with the upper portion of the plug to prevent fluid escape at this point.

Immediately below this seat, the side wall of the socket is provided with an annular recess to receive lubricating material which prevents the escape of fluid and lubricates the plug at this location. The recess communicates with the slots so that the lubricating medium will be introduced therein when fluid pressure is applied to the lubricant in the chamber 10.

As illustrated in Fig. 4, the flange 16 of the collar is provided with a recess 18 extending one-fourth of the distance around the collar and receiving a projection 19 formed on the shank 20 of the plug. The movement of the plug is thereby limited through the engagement of the projection 19 with the shoulders formed by the ends of the recess. The upper end of the shank 20 is formed with wrench-receiving surfaces 21 for the convenient rotation of the plug in the socket in the valve adjusting operation.

The body may be provided with one or more fittings through which the lubricating medium may be introduced to the chamber 10 and the pockets 6 while the valve is in use. As shown in Fig. 1, the pockets 6 extend from the slots rearwardly to points spaced beyond a vertical plane passing through the longitudinal axis of the socket at right angles to the fluid passage of the valve body. This distance may be varied, depending upon the resiliency desired in the walls separating the pockets from the socket. Due to the resiliency of these walls, foreign material caught between the plug and the walls will not score the socket side walls but will cause them to flex sufficiently to permit the material to move toward the slots 7 when the plug is rotated.

While the slot 12 has been illustrated as being formed in the plug, other passage-forming means may be provided either in the plug or the body, the primary intention being that the passageway will provide communication between the inlet opening and the pockets 6 when the plug is in a fluid flow obstructing position. While but a single modification has been illustrated, it is obvious that many minor changes may be made in the construction and relation of parts without departing from the spirit and scope of the invention as set forth in the following claims.

What is claimed is:

1. A stop valve comprising a body formed with inlet and outlet openings and a tapered socket communicating therewith, said socket having one open end, the closed end thereof being slightly enlarged to form a lubricant-receiving chamber, lubricant-receiving pockets formed in the side walls of said body, the side wall of said socket being provided with longitudinally extending slots adjacent the outlet opening to establish communication between said pockets and the socket, said slots also opening into the chamber at the closed end of said socket, and a tapered plug having a port for establishing communication between said inlet and outlet openings rotatably positioned in said socket, said plug having a passage for establishing communication between the inlet opening of said body and said lubricant chamber when said plug is positioned to interrupt communication between the inlet and outlet openings.

2. A stop valve comprising a body formed with inlet and outlet openings and a tapered socket communicating therewith, said socket having one open end, a lubricant-receiving pocket provided in each side wall of said body, the side wall of said socket being formed with a longitudinally extending slot adjacent each side of the outlet opening of said body to establish communication between said pockets and the socket, and a tapered plug rotatably disposed in said socket, the lower end of said plug terminating in spaced relation from the closed end of said socket to provide a lubricant-receiving chamber, said plug having a port to establish communication between the inlet and outlet openings of said body, said slots extending below the lower end of said plug to establish communication between the lubricant-receiving pockets and chamber, said plug being formed with a passage for connecting said chamber with the inlet opening when said plug is positioned to interrupt communication between said inlet and outlet openings.

3. A stop valve comprising a body having a tapered socket and inlet and outlet openings communicating therewith, a seat surrounding the outlet opening, a lubricant-receiving pocket provided in each side wall of said body, flexible wall means separating said pockets from said socket, said wall means terminating in slightly spaced relationship from said seat to provide slots for establishing communication between the pockets and said socket, a tapered plug rotatably positioned in said socket, said plug having a port to establish communication between said inlet and outlet openings when said plug is in one position, and passageway-forming means provided in said valve for establishing communication between said inlet opening and said pockets when said plug is in position to interrupt communication between said inlet and outlet openings.

4. A stop valve comprising a body having a tapered socket and inlet and outlet openings communicating therewith, a seat surrounding the outlet opening, a lubricant-receiving pocket provided in each side wall of said body, flexible wall means separating said pockets from said socket, said wall means terminating in slightly spaced relationship from said seat to provide slots for establishing communication between the pockets and said socket, and a tapered plug positioned for rotary movement in said socket, said plug having a port to establish communication between said inlet and outlet openings when said plug is in one position, said plug and body being provided with grooves to establish communication between the inlet opening and the lubricant-receiving pockets when said plug is in a predetermined position.

5. In a stop valve, a body member having a plug-receiving socket and inlet and outlet openings communicating therewith, a narrow seat surrounding said outlet opening, a lubricant-receiving pocket provided in each side wall of said body member, and a relatively flexible wall separating each pocket from said socket, said walls terminating at the forward edges in slightly spaced relationship from said seat to provide slots for establishing communication between said pockets and said socket, said flexible walls being joined at the rear portions thereof with said body.

6. In a stop valve, a body member having inlet and outlet openings and an open-topped plug-receiving socket communicating therewith, the side wall of said socket being formed with a relatively narrow slot in slightly spaced relationship from the sides of said outlet opening, the side walls of said body being provided with lubricant-receiving pockets extending rearwardly from said slots at least to points in transverse registration with the longitudinal axis of said socket, said pockets being separated from said socket by relatively resilient walls.

7. In a stop valve, a body member having inlet and outlet openings and an open-topped plug-receiving socket communicating therewith, the side wall of said socket being formed with a relatively narrow slot in slightly spaced relationship from the sides of said outlet opening, the side walls of said body being provided with lubricant-receiving pockets extending rearwardly from said slots at least to points in transverse registration with the longitudinal axis of said socket, said pockets being separated from said socket by relatively resilient walls, said slots terminating in spaced relation from the open end of said socket to provide an uninterrupted annular seat at the upper end of said socket.

8. In a stop valve, a body member having inlet and outlet openings and an open-topped plug-receiving socket communicating therewith, the closed end of said socket being slightly enlarged to provide a lubricant-receiving chamber, the side wall of said socket being formed with a relatively narrow slot in slightly spaced relationship from the sides of said outlet opening, the side walls of said body being provided with lubricant-receiving pockets extending rearwardly from said slots at least to points in transverse registration with the longitudinal axis of said socket, said pockets being separated from said socket by relatively resilient walls, said slots communicating at their lower ends with said chamber and terminating at their upper ends in spaced relation from the open end of said socket to provide an uninterrupted annular seat at the upper end of said socket.

9. In a stop valve, a body member having inlet and outlet openings and an open-topped plug-receiving socket communicating therewith, the closed end of said socket being slightly enlarged to provide a lubricant-receiving chamber, the side wall of said socket being formed with a relatively narrow slot in slightly spaced relationship from the sides of said outlet opening, the side walls of said body being provided with lubricant-receiving pockets extending rearwardly from said slots at least to points in transverse registration with the longitudinal axis of said socket, said pockets being separated from said socket by relatively resilient walls, said slots communicating at their lower ends with said chamber and terminating at their upper ends in spaced relation from the open end of said socket to provide an uninterrupted annular seat at the upper end of said socket, said body being provided with an annular lubricant-receiving groove immediately below said annular seat.

10. A stop valve comprising a body formed with inlet and outlet openings and a tapered socket communicating therewith, said socket having one open end, the closed end thereof being slightly enlarged to form a lubricant-receiving chamber, lubricant-receiving pockets formed in the side walls of said body, the side wall of said socket being provided with longitudinally extending slots adjacent the outlet opening to establish communication between said pockets and the socket, said slots also opening into the chamber at the closed end of said socket, a tapered plug having a port for establishing communication between said inlet and outlet openings rotatably positioned in said socket, said plug having a passage for establishing communication between the inlet opening of said body and said lubricant chamber when said plug is positioned to interrupt communication between the inlet and outlet openings, and means carried by said valve for engaging said plug to limit the rotary movement thereof.

11. A plug valve comprising a body having inlet and outlet ports and a tapered socket communicating therewith, the side wall of said socket being provided with longitudinally extending lubricant grooves, a tapered plug disposed in said socket for rotary adjustment, said plug being formed with a transverse port for establishing communication between the inlet and outlet ports in one position of adjustment of said plug, one end of said plug being spaced from the corresponding end of the socket to provide a lubricant chamber in direct communication with the lubricant grooves in the socket wall, and passage means controlled by the movement of said plug to provide communication between the inlet port and the lubricant chamber only when the plug is in position to prevent communication between the valve inlet and outlet ports.

12. In a plug valve of the type having a casing formed with inlet and outlet ports and a socket communicating therewith, the wall of said socket being formed with lubricant receiving grooves substantially coextensive with the socket and a plug disposed in said socket for adjustment about the longitudinal axis of the socket, said plug having a transverse port to establish communication between the inlet and outlet ports when said plug is in one position of adjustment, passage forming means controlled by the movement of said plug to introduce line pressure from the inlet port of the body to the lubricant grooves only when the plug is in position to interrupt communication between the inlet and outlet ports.

HOMER J. WADDELL.